B. R. KILLIAN.
DEMOUNTABLE RIM.
APPLICATION FILED AUG. 8, 1919.
1,360,760.
Patented Nov. 30, 1920.
2 SHEETS—SHEET 1.
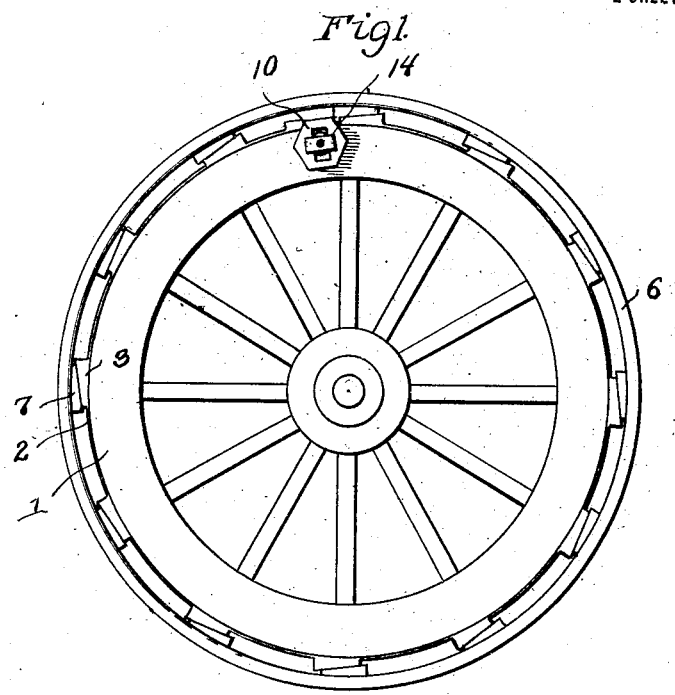
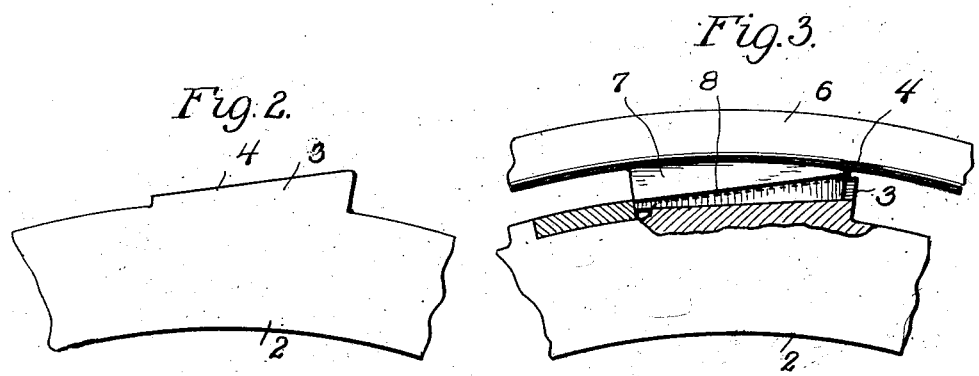
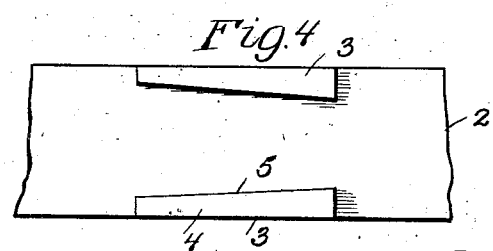
INVENTOR.
BY B. R. Killian.
Victor J. Evans
ATTORNEY.

B. R. KILLIAN.
DEMOUNTABLE RIM.
APPLICATION FILED AUG. 8, 1919.
1,360,760.
Patented Nov. 30, 1920.
2 SHEETS—SHEET 2.
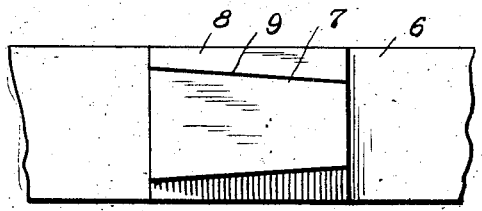
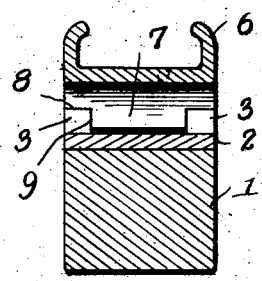
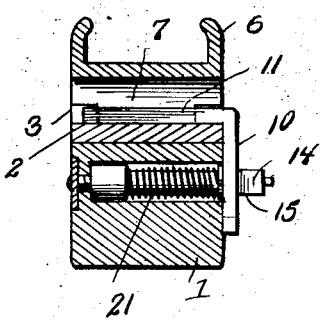
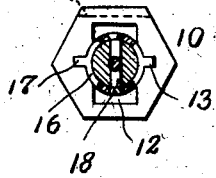
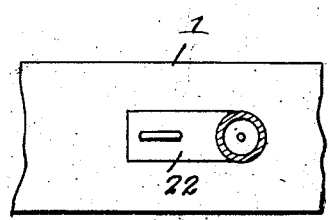
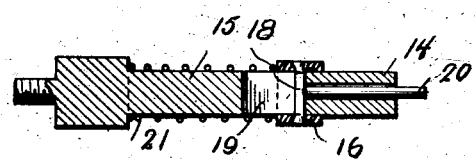
INVENTOR.
BY B. R. Killian.
Victor J. Evans
ATTORNEY.

UNITED STATES PATENT OFFICE.

BAXTER R. KILLIAN, OF CENTRALIA, WASHINGTON.

DEMOUNTABLE RIM.

1,360,760.  Specification of Letters Patent.  Patented Nov. 30, 1920.

Application filed August 8, 1919. Serial No. 316,158.

*To all whom it may concern:*

Be it known that I, BAXTER R. KILLIAN, a citizen of the United States, residing at Centralia, in the county of Lewis and State of Washington, have invented new and useful Improvements in Demountable Rims, of which the following is a specification.

This invention relates to demountable rims, and has for its primary object the provision of a rim of simple, substantial construction that may be more quickly arranged into place and removed.

An object of the invention is to so construct the rim that it will be associated with the felly in a manner that the rim will be materially reinforced against strain in all directions.

Another object of the invention is to provide a construction wherein it is only necessary to operate a single element when necessary to remove the rim from the wheel.

Besides the above, my invention is distinguished in the novel manner of constructing and arranging the device, so that in the use of the wheel the rim will tend at all times to move into tighter connection with the wheel.

With these and other objects in view, the invention will be better understood from the following detailed description taken in connection with the accompanying drawings, wherein:

Figure 1 is a side elevation of a wheel showing my improved form of rim applied thereto.

Fig. 2 is a detail view of a portion of the wheel showing the rim removed.

Fig. 3 is a detail view of a portion of the rim when removed from the wheel.

Fig. 4 is a top plan view of a portion of the band.

Fig. 5 is a top plan view of a portion of the rim.

Figs. 6 and 7 are cross sectional views.

Fig. 8 is a sectional view through the wheel showing the locking key in side elevation.

Fig. 9 is a longitudinal sectional view of the locking key.

Figs. 10 and 11 are detail perspective views of a portion thereof.

Again referring to the drawings, illustrating one of the many forms in which the invention may be constructed the numeral 1 designates a felly, upon which is mounted a band 2, that is constructed to coöperate with my improved form of rim. This band at spaced intervals is provided with projections 3, each constructed to have two inclined surfaces 4 and 5, for the purpose hereinafter described.

The rim 6 is provided at spaced intervals with lugs 7, each having inclined surfaces 8 for coöperation with the surface 4 of the projection, and with other inclined surfaces 9 for coaction with the inclined surface 5 of a projection. From this arrangement it will be seen that upon placing the rim upon the wheel and moving the same circumferentially, the inclined surfaces will engage and cause a binding action between the rim and band.

Attention is called to the fact that the inclined surfaces are so arranged that the rim will be drawn into tight engagement with the band in more than one direction for the purpose of preventing movement of the rim. To prevent disengagement of the inclined surfaces, I provide a key device 10, consisting of a key 11, constructed to create a wedging action between certain of the lugs and projections, so that the rim will be prevented from circumferential movement upon the wheel when the key is arranged in place. This key 11 is provided with an opening 12, with which communicate recesses 13. The opening 12 is of a size to allow of the free passage of the head portion 14 of a bolt 15. The relation of the opening 12 to the head 14 is set so that when the bolt is slightly rotated the head will pass transversely across the opening and lock the key against movement. For the purpose of preventing this movement of the bolt in an accidental manner, the bolt has slidably mounted thereon a collar 16, from which project lugs 17 adapted to enter the recesses 13. This collar has a pin 18 passing through a slot 19 in the bolt. It will be seen that when the lugs are arranged in the recesses, it is impossible to give the required rotary action to the bolt. For the purpose of retracting the lugs from the recesses 13, when the rim is to be removed, I provide a plunger 20, slidably mounted in the head of the bolt and connected to the pin 18, so that upon depressing the plunger the lugs will be forced from the recesses 13, against the action of the coil spring 21.

It is, of course, to be understood that any suitable tool may be constructed for giving this movement to the different parts of the key device.

From the foregoing description taken in connection with the accompanying drawings, it is apparent that I provide a rim of substantial construction, which will be positively held against movement when in applied position, but upon manipulation of a single element the rim will be free to be removed from the wheel.

It is to be understood that the invention may be constructed in various other manners and the parts associated, and therefore I do not desire to be limited in any manner, except as set forth in the appended claim.

For the purpose of accommodating the proper movement of the tire valve stem when arranging the rim in place, I provide a block 21 for closing the extra space required for the valve stem.

What is claimed is:

In combination, a felly, a band therefor, a rim, a plurality of coöperating projections on the band and rim and means for locking the rim upon the band comprising a plate member having an extension fitting between projections on the rim and band, a bolt rotatably mounted in a transverse recess in the felly and passing through an elongated opening in the plate member, a transverse head on said bolt member passable through said opening in one position and engaging against the sides thereof in another position, and means for preventing accidental rotation of said bolt.

In testimony whereof I affix my signature.

BAXTER R. KILLIAN.